C. Crenshaw,
Vine Cutter.
No. 93,681.        Patented Aug. 17, 1869.
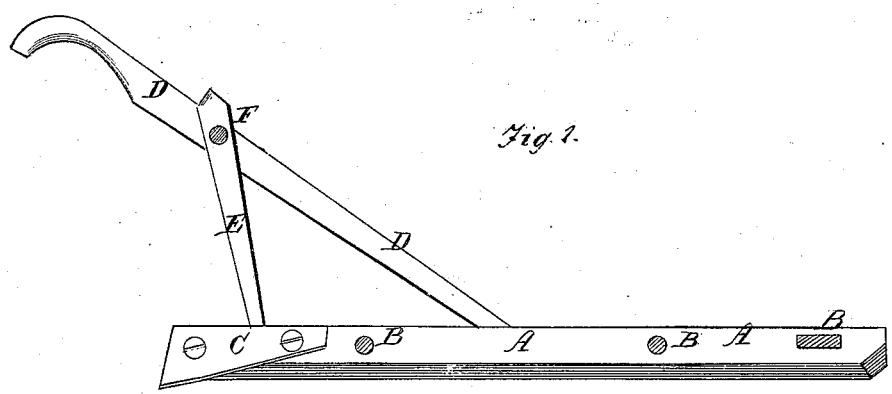
Fig. 1.
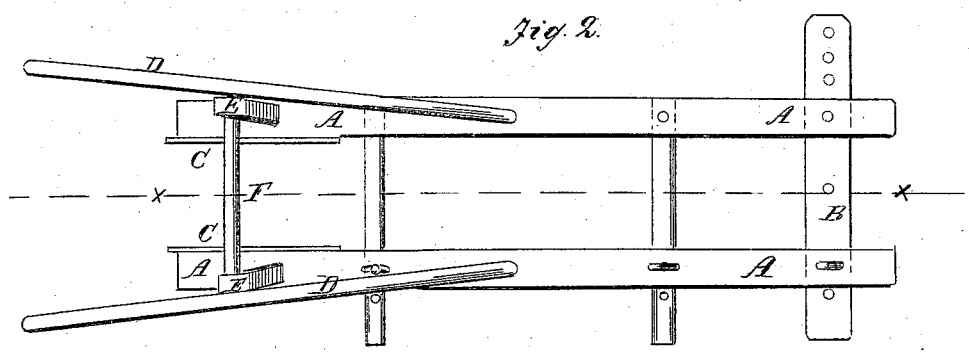
Fig. 2.
Fig. 3.
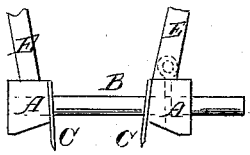
Witnesses:  
John H. Brooks  
Wm F. Clark
Inventor:  
C. Crenshaw  
per Munn & Co  
Attorneys

United States Patent Office.

CHARLES CRENSHAW, OF BARTLETT, TENNESSEE.

Letters Patent No. 93,681, dated August 17, 1869.

IMPROVEMENT IN VINE-CUTTER.

The Schedule referred to in these Letters Patent and making part of the same.

*To all whom it may concern:*

Be it known that I, CHARLES CRENSHAW, of Bartlett, in the county of Shelby, and State of Tennessee, have invented a new and useful Improvement in Vine-Cutters; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved machine, taken through the line $x\,x$, fig. 2.

Figure 2 is a top or plan view of the same.

Figure 3 is a rear-end view of the same, the handles being broken off.

Similar letters of reference indicate corresponding parts.

My invention has for its object to furnish an improved machine for cutting potato and strawberry-vines, which shall be simple and inexpensive in construction, and effective in operation; and It consists in the machine constructed as hereinafter more fully described.

A are two beams, placed parallel to each other, and adjustably connected by cross-bars B, to which the said beams A are secured by pins passing through holes in the said beams A, and through one or the other of the holes through the cross-bars B, as shown in the drawings, so that the beams A may be adjusted at a greater or less distance apart, according as the plants to be operated upon require to be trimmed more or less closely.

The cross-bars B, may be made adjustable at one or both ends, as may be desired or convenient.

The lower sides of the beams are bevelled off toward the inner edges, as shown in figs. 1 and 3.

To the inner sides of the rear ends of the beams A are attached cutters C, as shown in figs. 1, 2, and 3, inclining downward and rearward, as shown in fig. 1, so that, as the machine is drawn forward, the knives or cutters C, may cut off the vines or runners, the outer edges of the beams A at the same time holding the vines by their downward pressure while being cut.

D are the handles, the forward ends of which are secured to the beams A, and the upper or rear parts of which are connected with each other, and with the posts or braces E, by the cross-bar F.

The lower ends of the posts or braces E are attached to the rear parts of the beams A, as shown in the drawings.

The draught is attached to the forward cross-bar B, at its projecting end, so that the horse may walk at the side of the row being trimmed.

Having thus described my invention,

What I claim as new, and desire to secure by Letters Patent, is—

The vine-cutter, constructed, as described, of the laterally-adjustable parallel bars A, when bevelled upon their lower inner edges, and provided at their rear ends, upon the bevelled sides, with the inclined angular cutters C, and upon their upper sides with the laterally-adjustable handles and braces D E, all arranged and operating as described, for the purpose specified.

CHARLES CRENSHAW.

Witnesses:
B. LOWENSTEIN, Jr.,
F. UNDERWOOD.